United States Patent [19]

Massaloux

[11] 3,845,475

[45] Oct. 29, 1974

[54] SEQUENTIAL DATA TRANSMISSION SYSTEM WITH INSERTION OF SLOW-SEQUENCE OPERATIONS

[75] Inventor: Jean-Claude Massaloux, Hauts-de-Seine, France

[73] Assignee: Jeumont-Schneider, Houts-de-Seine, France

[22] Filed: June 11, 1973

[21] Appl. No.: 368,628

[30] Foreign Application Priority Data

June 15, 1972 France .............................. 72.21627

[52] U.S. Cl. .......................... 340/172.5, 235/92 CT

[51] Int. Cl. .............................................. G06f 9/00

[58] Field of Search . 340/172.5; 235/92 TF, 92 CT, 235/92 DP; 178/69.5 R

[56] References Cited

UNITED STATES PATENTS

| | | | |
|---|---|---|---|
| 3,419,880 | 12/1968 | Takano et al. | 235/92 TF |
| 3,445,639 | 5/1969 | Martens | 235/92 CT |
| 3,614,747 | 10/1971 | Ishihara | 340/172.5 |
| 3,623,017 | 11/1971 | Lowell | 340/172.5 |
| 3,644,895 | 2/1972 | Hemdal et al. | 340/172.5 |
| 3,646,520 | 2/1972 | Spencer | 340/172.5 |
| 3,651,486 | 3/1972 | Abrahamsson | 340/172.5 |
| 3,708,786 | 1/1973 | Hardin et al. | 340/172.5 |
| 3,735,101 | 5/1973 | Stewart | 235/92 CT |
| 3,736,567 | 5/1973 | Lotan et al. | 340/172.5 |

*Primary Examiner*—Gareth D. Shaw

[57] ABSTRACT

A sequential data transmission system such that an instruction for slow-sequence operations being inserted into a program of fast-sequence operations controlled by a pulse counter. The same is controlled by a clock and associated with sequence switch. The system is characterized in that when a slow sequence is triggered, the counter produces the zero state at the output of a first logic operator connected to the input of a pulse-shaping circuit whose output is connected to the first input of a second logic operator, the same having two inputs. The second input of the second logic operator is connected to a normally open relay contact which closes upon termination of the slow-sequence operation. The output of the second logic operator is connected to an input of a bistable and causes the output thereof to take up a fixed logic state if the pulse-shaping circuit is operative and if the relay contact is open. This fixed logic state blocks the pulse counter by way of a third logic operator; and the bistable positioned in accordance with the foregoing is reset by a signal which is synchronous with but offset from the clock signal.

7 Claims, 2 Drawing Figures

FIG. I

SEQUENTIAL DATA TRANSMISSION SYSTEM WITH INSERTION OF SLOW-SEQUENCE OPERATIONS

BACKGROUND OF THE INVENTION

1. Field of the Invention

This invention relates to a sequential data transmission system such that an instruction for slow-sequence operations can be inserted into a program of fast-sequence operations controlled by a pulse counter, the same being controlled by a clock and associated with a sequence switch.

The system according to the invention is of use for any data transmission system comprising fast sub-assemblies (remote transmissions, automatic systems, etc).

2. Description of the Prior Art

In most sequential systems the various sequences are switched on by a counter under the control of a clock which allots a particular time interval or time slot to each operation.

Some of these operations may entail actuation of (peripheral) sub-assemblies which operate much more slowly than most of the sub-assemblies. This is the case, for instance, with a printer or with relay devices. Introducing such operations — which also last for widely varying lengths of time — into the sequences complicates programming of the system and increases cycle times. Some systems obviate the disadvantage by using complicated and expensive interfaces to condense the operation of the slow sub-assembly, the operating time of which is therefore converted, so far as the system is concerned, to the time for a normal operation (buffer store).

SUMMARY OF THE INVENTION

In the system according to the invention, when a slow sequence is triggered, the counter produces the zero state at the output of a first logic operator connected to the input of a pulse-shaping circuit whose output is connected to the first input of a second logic operator, the same having two inputs, the second input of the second logic operator being connected to a normally open relay which closes upon termination of the slow-sequence operation; the output of the second logic operator is connected to an input of a bistable and causes the output thereof to take up a fixed logic state if the pulse-shaping circuit is operative and if the relay contact is open; this fixed logic state blocks the pulse counter by way of a third logic operator; and the bistable set in accordance with the foregoing is reset by a signal which is synchronous with but offset from the clock signal.

With the system according to the invention, when a slow-sequence operation is required at a particular stage of the fast-sequence operations, the slow-sequence operation can be inserted without upsetting programming by inhibiting the advance of the sequence control pulse counter at the start of the slow-sequence operation and releasing such counter at the end of such operation.

BRIEF DESCRIPTION OF THE DRAWINGS

The invention will be more clearly understood from an embodiment, reference being made to the accompanying drawings where.

DESCRIPTION OF THE PREFERRED EMBODIMENT

Figure 1:
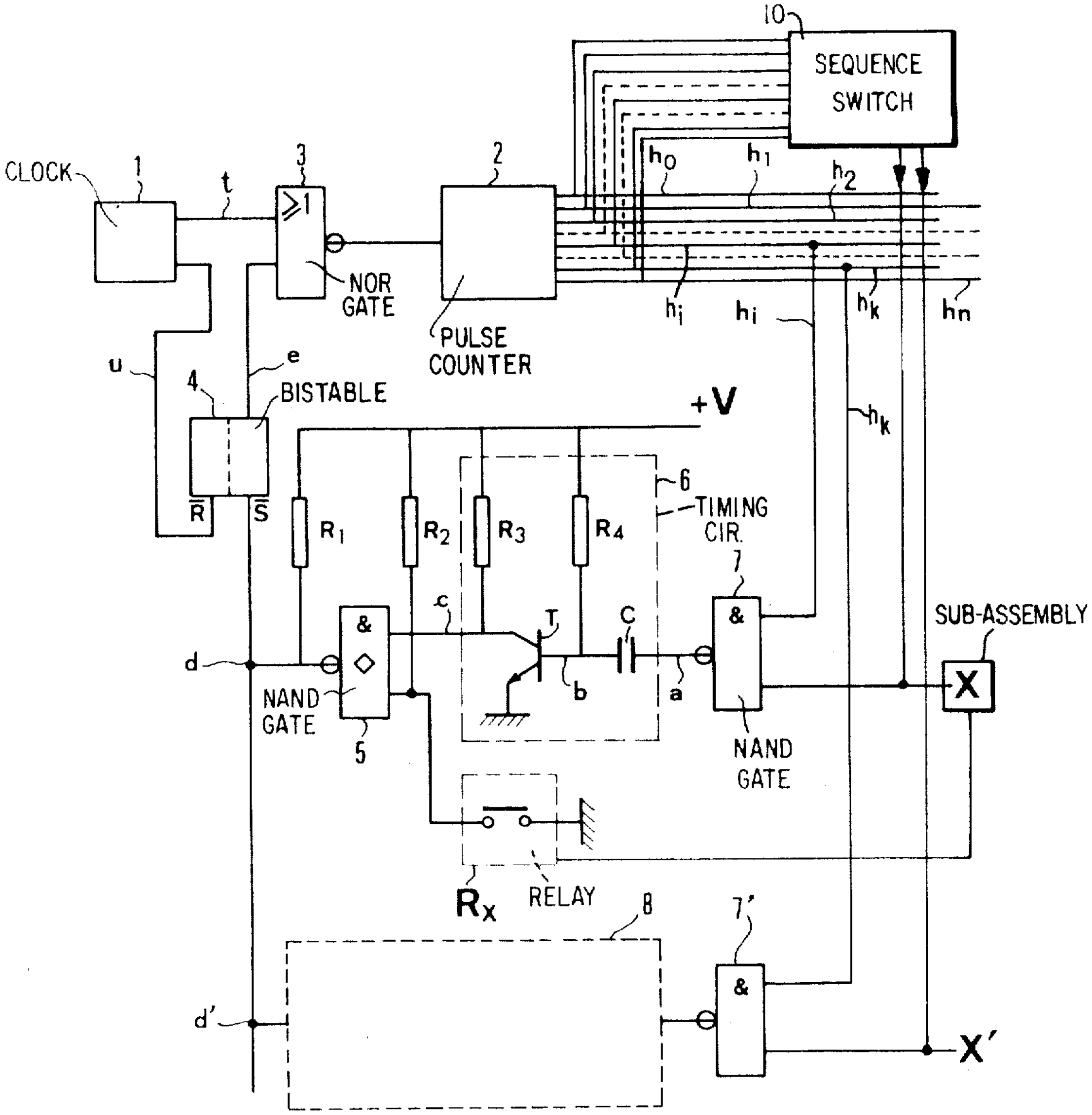
FIG. 1 shows the logic diagram of a system according to the invention.

As shown in FIG. 1, the system comprises a Nor-gate 3 which is interposed between a pulse counter 2, controlling switching of sequences via its outputs $h_0$ $h_1$ . . . $h_n$, and a clock 1 controlling the counter 2. A sequence switch 10 associated with the counter 2 is also shown in FIG. 1.

The output of nor-gate 3 is connected to the input of counter 2; one input of nor-gate 3 is connected to the output of clock 1 and the other input of nor-gate 3 is connected to a bistable $\overline{R}\overline{S}$ 4. Nor-gate 3 transmits the clock signals to counter 2, and thus initiates the instruction for changeover to the next movement, only if the output of bistable 4 is in the 0 state.

Input $\overline{R}$ of bistable 4 receives the clock signals with a predetermined offset, and input $\overline{S}$ of bistable 4 receives the output from a phantom nand-gate 5 (wire nand-gate).

A resistance $R_1$ connects the input $\overline{S}$ of bistable 4 to a power supply V which, in the absence of signals at the output of nand-gate 5, imposes the 1-state at bistable input $\overline{S}$.

Nand-gate 5, which has two inputs, has its output connected to bistable input $\overline{S}$; the first input of nand-gate 5 is connected to a contact of a relay $R_x$, closure of the contact causing the 0 state to appear at such input, and is connected via a resistance $R_2$ to the power supply V, and the second input of nand-gate 5 is connected to a pulse-shaping circuit 6 timing circuit, comprising:

An NPN transistor whose emitter is earthed and whose collector is connected to the input of nand-gate 5 and whose base is connected to one side of a capacitor C;

a resistance $R_3$ connecting the collector of transistor T to power supply V;

a resistance $R_4$ connecting the base of transistor T to power supply V, and the capacitor C which has one side connected to the base of transistor T and the other side connected to the output of a nand-gate 7.

One input of nand-gate 7 receives signals from one output, e.g., the output $h_i$, of counter 2 and the other input of nand-gate 7 receives signals from the sequence switch which outputs a 1 state when the slow sub-assembly X is required to operate. The sequence switch permits an operator to readily change the selection and the order of the slow sub-assemblies utilized.

The system operates as follows:

It will be assumed that the slow sub-assembly X is to come into the sequence being performed at the time when counter 2 transmits a signal at its output $h_i$. This time is distinguished by the simultaneous appearance of two 1 states at the inputs of nand-gate 7. The same therefore outputs a 0 state and thus earths the corresponding side of the capacitor C of the pulse-shaping circuit 6. Due to this earthing the base current of transistor T flows through capacitor C and the transistor T cuts off. The cutting-off of transistor T causes its collector to change to the 1 state, and the corresponding input of nand-gate 5 therefore also changes to the 1 state.

Since both the inputs of nand-gate 5 are in the 1 state (the contact of relay $R_X$ being open), nand-gate 5 outputs a 0 state, which, when applied to bistable input $\overline{S}$, changes of bistable 4 and causes its direct output *e* to take up a 1 state. The result of this 1 state being applied to the input of nor-gate 3 causes the same to output a 0 state, so that the advance of the counter 2 is inhibited notwithstanding any signals from the clock 1. The counter 2 remains cut off for as long as the bistable 4 continues to have a 0 state applied to its input $\overline{S}$ - i.e., for as long as the state of output *d* of nand-gate 5 does not alter.

Nand-gate 5 changes its state:

either because transistor T becomes conductive again and applies a 0 state to the corresponding input of operator 5. This restoration of conductivity occurs automatically after a time corresponding to the charging time of capacitor C from the power supply V through resistance $R_4$;

or because the contact of the relay $R_X$ closes to impose a 0 state at the corresponding input of nand-gate 5.

The normally open contact of the relay $R_X$ closes when the sub-assembly X responsible for a slow-sequence operation receives the order to perform the operation and has finished performing the same.

When the output from nand-gate 5 changes over to the 1 state, bistable input $\overline{S}$ returns to the 1 state, and when bistable input $\overline{R}$ receives a clock signal *u*, bistable 4 changes its state and outputs a 0 state which acts via nor-gate 3 to release the counter 2 to receive the clock signals again and to resume switching the next sequences. The counter 2 is therefore released either upon completion of the operation of the slow sub-assembly X (normal operation) or at the latest after a predetermined time interval.

The counter 2, when it resumes its advance, ceased to output a signal at its output $h_i$, so that the output of nand-gate 7 changes its state.

To simplify the explanation only a single blocking circuit has been referred to; clearly, however, the system is of use in cases where there are a number of slow sub-assemblies each having a counter-blocking circuit of the kind described. This is the case of the slow sub-assembly X' associated with output $h_k$ of counter 2 at the input of a nand-gate 7' identical to nand-gate 7, whose output is connected at a place d' to input $\overline{S}$ of bistable 4 by a circuit 8 identical to the circuit interposed between nand-gate 7 and the position *d* in the previous description.

The system also applies in toto if the bringing into operation of the sub-assembly X is dependent upon a number of conditions $$\sum h_i \cdot X_i.$$

Figure 2:
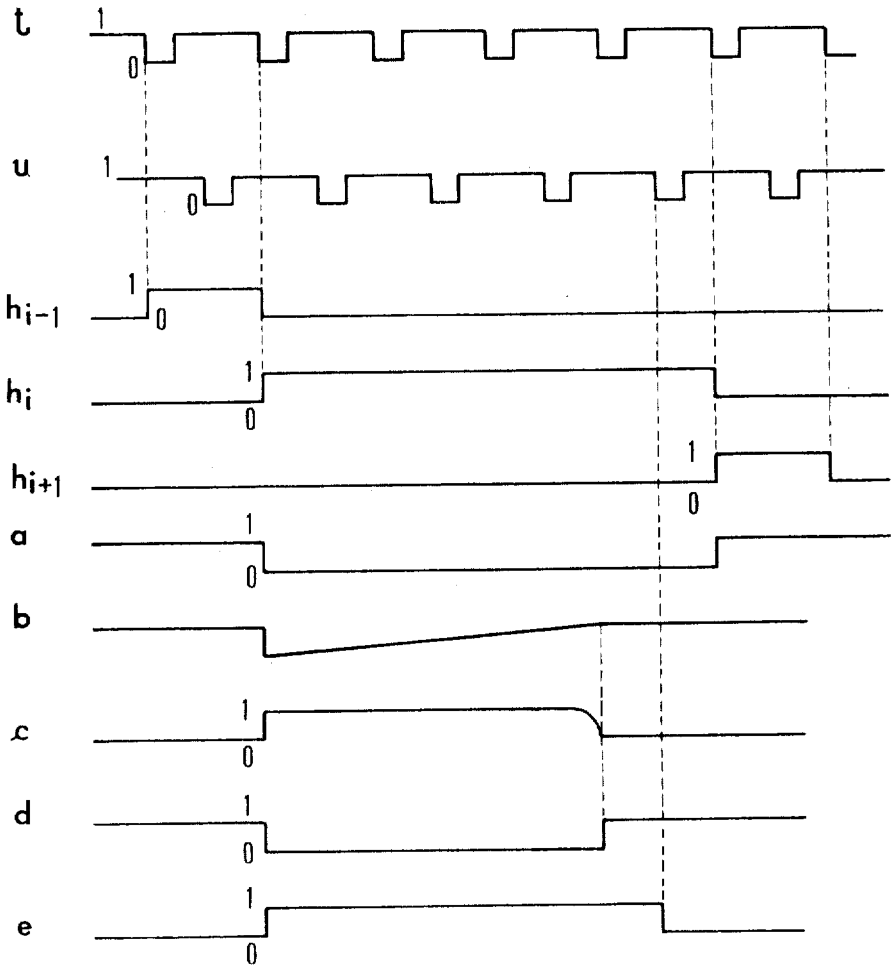
FIG. 2 is a timing diagram for signals received at various points on the diagram of FIG. 1.

FIG. 2 shows the timing diagram for various parts of the diagram of FIG. 1, as follows:

*t*, signal from clock 1.

*u*, signal synchronous with but offset from the clock signal at the input $\overline{R}$ of bistable 4.

$h_{i-1}$, $h_i$, $h_{i+1}$, three consecutive outputs of counter 2.

*a*, output of nand-gate 7.

*b*, base of transistor T.

*c*, collector of transistor T.

*d*, input $\overline{S}$ of bistable 4.

*e*, direct output of bistable 4, corresponding to input $\overline{S}$.

The logic operations 7, 7' etc., can have a number of inputs connected to other sub-assemblies, as X and X', with special control bits, without departure from the scope of this invention.

Also, a monostable element can be used instead of the pulse-shaping circuit 6.

The invention is of use for remote controls and remote indication facilities whenever slow-sequence operations have to be fitted in to a system of rapid-sequence data transmissions.

I claim:

1. In an assembly comprising a plurality of subassemblies, apparatus for inhibiting control pulses controlling fast sequence operations of relatively fast sub-assemblies to permit slow sequence operations for relatively slow sub-assemblies comprising:

a. clock means for providing clock pulses,
b. pulse counter means connected to receive said clock pulses and to provide said control pulses,
c. switching means connected to receive said control pulses and to provide a switching output signal associated with a first relatively slow sub-assembly,
d. logic means connected to receive said switching output signal and connected to inhibit said control pulses from said pulse counter means by providing a counter inhibit signal,
e. said logic means comprising:
   a first timing circuit responsive to said switching output signal and said control pulses, said timing circuit providing a timed inhibit signal, said time inhibit signal terminating after a fixed time,
   relay means controlled by said first relatively slow sub-assembly for providing a relay signal upon completion of said slow sequence of operations associated with said first relatively slow sub-assembly, and
   first gate means connected to receive said timed inhibit signal and said relay signal, said first gate means providing said counter inhibit signal to said pulse counter means in response to said timed inhibit signal, and said first gate means terminating said counter inhibit signal in response to said relay signal.

2. Apparatus as recited in claim 1 wherein said timing circuit comprises a monostable multivibrator.

3. Apparatus as recited in claim 1 further comprising a timing circuit, associated relay means and associated first gate means for each of a plurality of separate relatively slow sub-assemblies.

4. Apparatus as recited in claim 1 wherein said relay means comprises a normally open relay.

5. Apparatus as recited in claim 1 further comprising:

a. second gate means connected between said clock means and said pulse counter means, and
b. bistable circuit means having one input connected to said first gate means, said bistable circuit means having an output connected to said second gate means.

6. Apparatus as recited in claim 6 further comprising a timing circuit, associated relay means and associated first gate means for each of a plurality of separate relatively slow sub-assemblies and wherein the first gate means corresponding to each of said relatively slow sub-assemblies is connected to said one input of said second gate means.

7. Apparatus as recited in claim 6 wherein said clock means provides a series of second clock pulses to a second input of said bistable circuit.

* * * * *

UNITED STATES PATENT OFFICE
CERTIFICATE OF CORRECTION

Patent No. 3,845,475 Dated October 29, 1974

Inventor(s) JEAN-CLAUDE MASSALOUX

It is certified that error appears in the above-identified patent and that said Letters Patent are hereby corrected as shown below:

The Assignee's name is HAUTS DE SEINE.

IN THE SPECIFICATION:

Column 2, line 32, "$R_X$" should read -- $R_X$ --.

Signed and sealed this 11th day of February 1975.

(SEAL)
Attest:

RUTH C. MASON
Attesting Officer

C. MARSHALL DANN
Commissioner of Patents
and Trademarks